Sept. 8, 1964   J. J. MONAHAN   3,147,867
APPARATUS FOR FEEDING POLARIZED ARTICLES
Filed April 25, 1962   3 Sheets-Sheet 1
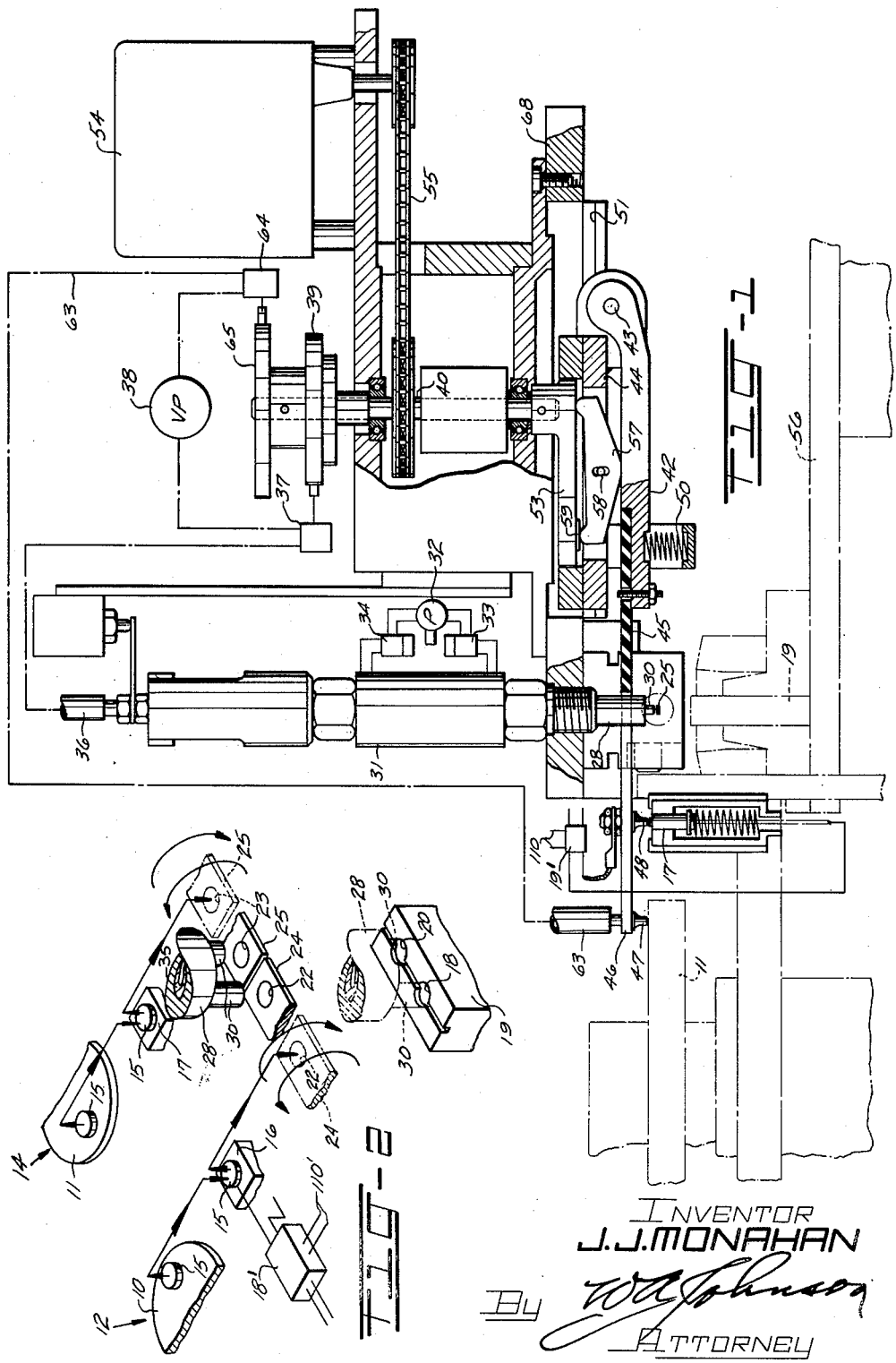
INVENTOR
J.J. MONAHAN
By W.A. Johnson
ATTORNEY

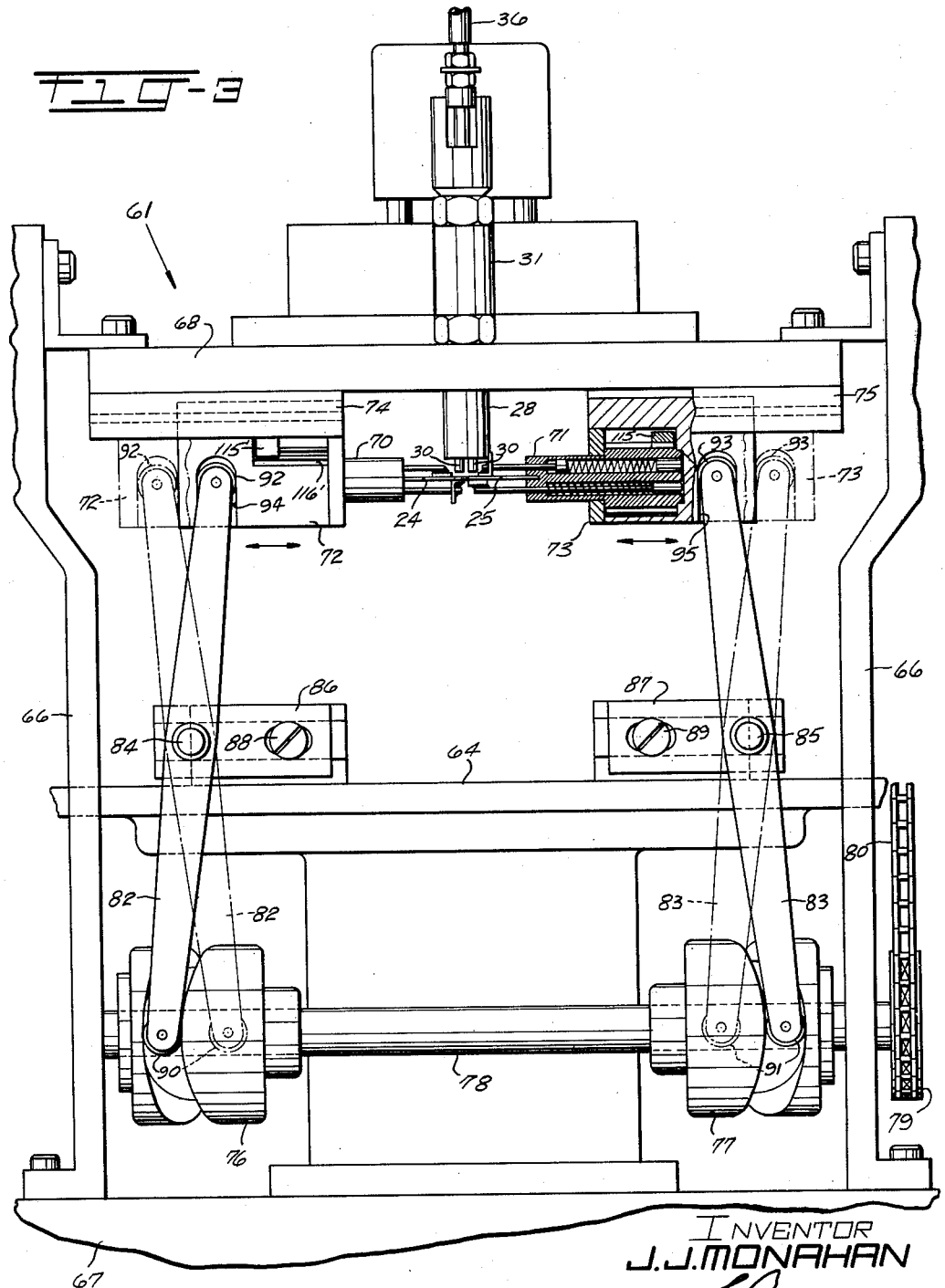

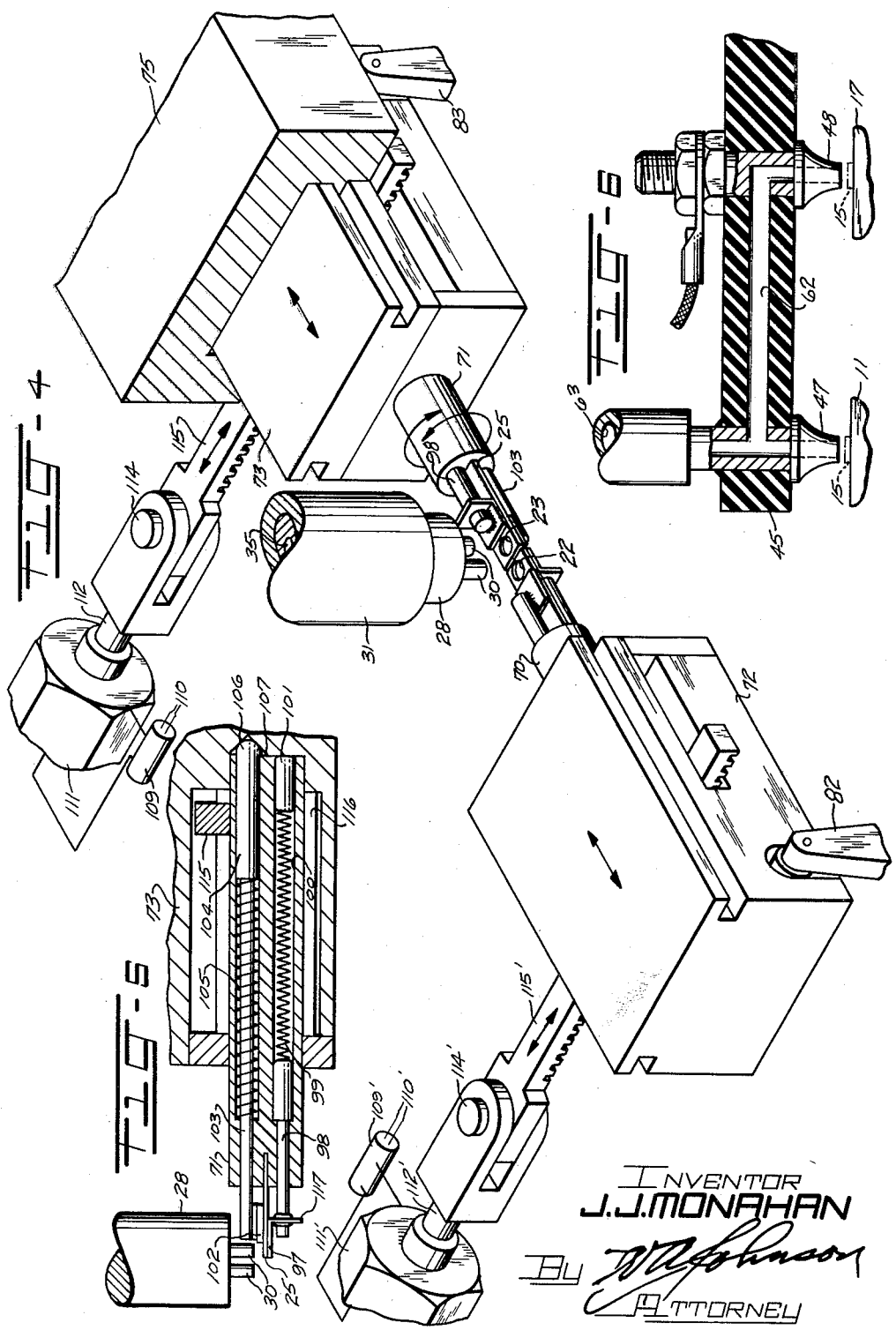

3,147,867
APPARATUS FOR FEEDING POLARIZED ARTICLES
Jack J. Monahan, Allentown, Pa., assignor to Western Electric Company, Incorporated, New York, N.Y., a corporation of New York
Filed Apr. 25, 1962, Ser. No. 190,121
8 Claims. (Cl. 214—1)

This invention relates to apparatus for feeding polarized articles in predetermined positions, particularly diffused silicon wafers used in the manufacture of electrical components, such as varistors.

In the manufacture of components of this type with the use of polarized articles such as diffused silicon wafers as illustrated in the co-pending application of H. T. Campbell, J. J. Monahan and J. A. Roeder, Serial No. 157,965, filed December 8, 1961; two wafers are required for each component and these wafers must be positioned in reverse order, that is, one with its negative face upwardly and the other with its positive face upwardly. The wafers are assembled in supply tubes or hoppers externally of the machine and brought to the machine at predetermined intervals with the wafers in one tube having their negative sides positioned upwardly and the wafers in the other tube positioned with their positive side upwardly.

An object of the present invention is an apparatus which may be mounted in a machine of the type shown in the aforementioned co-pending application and may efficiently and accurately receive polarized articles and orient them to predetermined positions prior to being fed to successive receptacles which may be parts of the aforementioned machine.

In accordance with the object the invention comprises an apparatus for feeding polarized articles in a predetermined position to successive receptacles including a unit adapted to receive and test the polarity of the successive articles after which the articles are moved successively to an orienting unit responsive to the test on the successive articles to retain each article in its predetermined position or orient each article into that position prior to being fed to a receptacle.

Other objects and advantages will be apparent from the following detailed description when considered in conjunction with the accompanying drawing wherein:

FIG. 1 is a vertical sectional view of the apparatus shown in association with a turret-type machine having radially positioned receptacles for the articles;

FIG. 2 is a schematic isometric view of portions of the apparatus illustrating movements of the articles from a supply station to the receptacles;

FIG. 3 is a front elevational view of the apparatus;

FIG. 4 is an enlarged fragmentaary isometric view of the orienting units;

FIG. 5 is an enlarged fragmentary sectional view of one of the orienting units; and, FIG. 6 is an enlarged vertical sectional view of a portion of the transfer unit.

Attention is first directed to FIG. 2 which illustrates rotatable tables 10 and 11 located at supply stations indicated generally at 12 and 14 and movable relative to conventional feeding means such as vibrating feeders (not shown) adapted to feed polarized articles 15 through chutes (not shown) to desired locations on the tables 10 and 11 so that the articles may be moved successively into the pickup positions shown. The articles are transferred from the pickup positions on the tables 10 and 11 to lower contacts 16 and 17 where the articles 15 are included electrically in testing units 18' of FIG. 2 and 19' of FIG. 1. In the present instance, the articles 15 are polarized silicon wafers and it is important, for example, that the wafers initially disposed on the support 10 reach nests 18 of receptacles 19 with their negative sides or faces uppermost and that the articles initially disposed on the table 11 reach nests 20 in the receptacles 19 with their positive sides or faces uppermost.

The polarized articles 15 are transferred from the lower contacts 16 and 17 to apertures 22 and 23 in elements 24 and 25 of orienting units. The elements 24 and 25 will be moved inwardly toward each other and, during the interval after the articles 15 have been placed in their respective apertures 22 and 23 and the elements start the movements toward each other, the orienting units will remain in their normal positions if the articles are located in their respective predetermined positions with the article in aperture 22 having its negative side uppermost and the article in aperture 23 having its positive side uppermost. If either article, when disposed in its orienting unit or the element 24 or 25 thereof, is not in the predetermined position the orienting unit will be controlled by its respective test unit 18' or 19' to turn the element through 180° to invert the article and locate it in its predetermined position. A feeder 28, which may be similar in structure to one of the feeders shown in a co-pending application of H. T. Campbell, J. J. Monahan, J. A. Roeder, Serial No. 158,080, filed December 8, 1961 is operated to pick up the articles from the apertures 22 and 23 and feed them to their nests 18 and 20.

In FIG. 1 the feeder 28, with its suction nozzle 30 positioned to pick up the articles from their apertures 22 and 23 of the elements 24 and 25 when in their inner position shown in FIG. 2, is supported by a piston-like structure (not shown) disposed in an air cylinder 31 and movable in response to air under pressure. For example, the air under pressure may be from a pump 32 under the control of solenoid valves 33 and 34 to impart predetermined movements to the feeder 28 from its normal up position to a slightly lower position to engage the parts in the apertures 22 and 23, remove the articles from the apertures of the elements and, after the elements have been returned to their outer positions, to lower the articles into their nests 18 and 20 of the receptacle 19 located at their receiving positions. The suction nozzles 30 are connected through a passageway 35 to a line 36 connected through a valve 37 to a vacuum pump 38. The valve 37 is controlled by a cam 39 mounted on shaft 40. Through this means, the period in which suction is created through the feeder 28 from the nozzles 30 is controlled to bring about pickup and releasing actions on the articles.

A transfer unit 42 pivotally supported at 43 on a carriage 44 is bifurcated at the left portion thereof. Actually this portion includes a dielectric member 45 having spaced legs 46 positioned to straddle the feeder 28 and support suction heads 47 and 48 on each leg and at like spaced positions so that the suction heads 47 in the positions shown will be engaging the articles 15 at the pickup positions on the tables 10 and 11 in the supply stations 12 and 14 simultaneously. At the same time, the suction heads 48 will be engaging the articles 15 on the lower contacts 16 and 17. These engagements are under predetermined pressure so that through leads shown in FIG. 2 the article 15 on the lower contact 16 will be included in the test unit 18' while the article on the lower contact 17 FIG. 1 will be included in the test unit 19'.

The transfer unit 42 includes a spring 50 normally urging the suction heads 47 and 48 into the up positions as represented by certain of the vertical arrows shown in FIG. 2. The carriage 44 is supported in guideways 51, only one of which is shown in FIG. 1, and is moved between limits to bring about the successive transfer of the polarized articles 15 from the pickup positions shown on the tables 10 and 11 by the suction heads 47 and their movements to the lower contacts 16 and 17 while at the same time the suction heads 48 move the polarized articles previously tested from the lower contacts 16 and 17 to the apertures 22 and 23 of the elements 24 and 25. This action is brought about through a half-cycle of a cam 53 which is mounted on the shaft 40 and driven by a motor 54 through a sprocket and chain connection 55. This operation is in timed relation with rotation of the tables 10 and 11 and also in timed relation with indexing actions of a turret 56 supporting the receptacles 19. A rocking member 57 pivotally supported at 58 in the carriage 44 is acted upon an auxiliary cam 59 disposed on the upper surface of the main cam 53. This action brings about the raising and lowering of the transfer unit 45 through the assistance of the spring 50 as represented by the vertical arrows in FIG. 2. The suction heads 47 and 48 are connected at 62 in FIG. 6 and jointly connected through a line 63 through a valve 64 to the vacuum pump 38. The valve 64 is controlled by a cam 65 mounted on the shaft 40 to control the intervals in which the articles 15 are picked up and released.

In FIG. 3 a main supporting frame 61 has vertical members 66 supported on a base 67 and provided with a lateral member 68 supporting the guides 51 in FIG. 1 for the carriage 44, and a housing 69 mounted on the base 67.

The elements 24 and 25 of FIG. 2 are parts of orienting units 70 and 71 supported for rotation in slides on carriages 72 and 73 supported for movement between their outer or normal position shown in broken lines in FIG. 3 and their inner or solid line positions while supported by guides 74 and 75. These movements are imparted to the slides 72 and 73 at predetermined intervals through the rotation of drum-like cams 76 and 77 which are mounted on a cam shaft 78 and rotated continuously or at predetermined intervals through a drive means represented by a sprocket 79 mounted on the cam shaft and a chain 80 which connects the cam shaft to a power means (not shown) such as a motor. Cam levers 82 and 83 are mounted on pivots 84 and 85 supported by members 86 and 87 adjustably mounted at 88 and 89 so that the positions of the limits of their movements of the orienting units 70 and 71 may be varied relative to the transfer unit 42 and the feeder 28. Cam followers 90 and 91 are mounted on the lower ends of the levers 82 and 83 for interengagements with the cams 76 and 77. Rollers 92 and 93 mounted on the upper ends of the levers 82 and 83 are disposed in grooves 94 and 95 of their respective slides 72 and 73 thereby operatively connecting the levers to the slides.

The orienting units 70 and 71 are identical in structure, the only difference lying in their relative positions and for this reason, the description of the unit 71 shown in FIG. 5 will apply to both units. The element 25 has been defined as having an aperture 23 therein this aperture being slightly larger in diameter than the article or wafer 15 so as to readily receive the successive wafers from the transfer unit and to permit their removal by the feeding unit 28. Therefore, it is necessary to provide a structure to close the normal lower end of the aperture 23. This is accomplished by an angular member 97 mounted on a rod 98, which is urged outwardly by a spring 99 held in an aperture 100 by a fixed plug 101. An auxiliary member 102 is mounted on the outer end of a rod 103 movably disposed in the orienting unit and having an inner portion 104 against which a spring 105 normally urges the rod inwardly so that a rounded end 106 of the member 104 will enter a recess 107 in the adjacent portion of the slide 73. While the orienting unit 71 is in the position shown in FIG. 5, the member 102 will be held away from the aperture 23 to permit successive feeding of the articles 15 thereto and will remain in this position until one of the articles is not in the predetermined position. For example, if all of the articles fed to the aperture 23 are to have their positive sides or faces uppermost and this condition should exist the orienting unit 71 will remain in the position shown in FIG. 5. However, the moment an article 15 is not in a predetermined position but has its negative side or face uppermost this will affect the test unit 19' of FIG. 1 to cause energization of the solenoid valve 109 of FIG. 4, through lines 110 to cause operation of an air cylinder 111 to move its piston rod 112 and its yoke-like connection 114 outwardly to move a rack 115 in a direction to cause rotation of a gear 116 mounted on the orienting unit 71 a distance sufficient to impart one-half revolution to the orienting unit. The gear 116 is of sufficient length to permit axial movement of the orienting unit 71 through movement of the slide 73 between its limits and retain operative connection with the rack 115. At the start of this one-half cycle of rotation to turn the polarized article in the aperture 23 up-side-down so that it will be disposed in the predetermined position, that is, with its positive face uppermost, the rounded end 106 of portion 104 of the rod 103 will be forced out of the recess 107 against the spring 105 to cause the member 102 to close its normal upper end of the aperture 23 in the element 25. Therefore, under this condition, both ends of the aperture 23 are closed and what normally is the top end of the aperture will be the bottom end thereof. The contour of the member 97 which at this time will be uppermost on top of the element 25 will have its vertical portion 117 positioned to engage the feeder 28 prior to the suction nozzles 30 being lowered to pick up the article and in this manner the member 97 is stopped during movement of the slide 73 from its outer or normal position to its inner position to uncover the upper portion of the aperture 23 and allow their respective suction nozzles 30 of the feeder 28 to pick up the article.

The test units 18' and 19' may be any suitable electrical control means conditioned to energize their solenoid valves 109 and 109' only when articles not in the predetermined positions are in the test units. The solenoid valves may be spring actuated to predetermined positions to hold their air cylinders 111 and 111' operated normally to position the upper ends of their apertures 22 and 23 upwardly, keep them in these positions until correctly positioned articles result in energization of the solenoid valves. Polarized articles of this type will permit electrical current to flow only in given directions. Therefore, as long as articles with their positive sides up engage the contact 17 of test units 19' and articles with their negative sides up engage the contact 16 of test unit 18', the solenoid valves 109 and 109' will remain de-energized in their normal positions. However, when these conditions change the orienting units 70 and 71 will operate. An article with its negative side up on contact 17 of test unit 19' will allow electrical current to flow to the solenoid valve 109 to energize it to cause the air cylinder 111 to operate the unit 71. The presence of an article with its positive side up on contact 16 of test set 18' will, in a similar manner, cause operation of unit 70.

This condition is carried out with both orienting units 70 and 71 and to follow the description regarding the orienting units 70 similar reference numerals 97' to 116' have been applied to the operating means associated with the orienting units 70.

*Operation*

Let it be assumed that the apparatus has been in operation and that there are polarized articles 15 at the pickup positions shown in FIG. 2 on tables 10 and 11 and also on the lower contacts 16 and 17 of the test units and in the apertures 22 and 23 of the elements 24 and 25 while their orienting units 70 and 71 are in their outermost positions. The apparatus when set in operation may be caused to carry out its successive operating actions or steps in accordance with the intermittent rotary movements of the turret 56 so as to locate receptacles 19 with their nests 18 and 20 beneath the feeder 28, to receive the pairs of polarized articles in the predetermined positions from the feeder 28. Therefore, it is possible for the motor 54 to rotate at a predetermined speed to cause the carriage 44 to move outwardly and when in their outermost positions shown in FIG. 1 the auxiliary cam 59 will cause the rocking element 57 to move the transfer unit downwardly so that the suction heads 47 and 48 during a desired interval will apply slight pressure on the articles. At the test stations the suction heads 48 act as conductive elements to include the polarized articles in circuits of the test units 18' and 19'. Here the polarity of each articles does one of two things, namely, causes no change in the normal position of its respective orienting unit 70 or 71 if the article is in its predetermined position or conditions the test set to cause operation of its orienting unit after the tested article has been disposed in its respective aperture 22 or 23 for inverting the article through the half cycle rotation of the orienting unit to correctly position the article for feeding to the nest 18 or 20 of the receptacle. The solenoid valves 109 and 109' are of the type to cause the air cylinders 111 or 111' to return to their normal position when they are de-energized so that every article fed to either aperture 22 or 23 will enter the normal upper end thereof. The orienting unit thereof will be in its normal position as shown in FIG. 5 but responsive to tests performed on the articles deposited on the apertures 22 and 23 to either leave the orienting units in their normal positions or rotate them 180° to move the articles into their predetermined positions prior to actuation of the feeder 28. The feeder is given the necessary double action to move downwardly a distance sufficient to move the suction nozzles 30 into engagement with the upper faces of the articles so that the articles through suction controlled cam 39 and valve 37 may remove the articles from their apertures 22 and 23, after which the slides 72 and 73 with orienting units 70 and 71 will be moved outwardly to permit the feeder 28 to move downwardly to place the articles in their nests 18 and 20 of the receptacle 19 after which the suction is cut off by the valve 37 and its cam 39 to allow the articles to remain in their nest and the feeder 28 to return to its uppermost position. Therefore, through the aid of the apparatus, polarized articles may be fed at any position to their tables 10 and 11. Due to the fact that the present articles are round wafers and it is not possible to orient them through the aid of conventional feeding means, they may be moved in either position to the apparatus but, prior to reaching the feeder 28, they must be tested so as to be allowed to remain in their predetermined position or oriented into their predetermined positions.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for feeding polarized articles in a predetermined position to successive receptacles comprising:
    a supply station,
    means disposed adjacent the supply station to move polarized articles successively to a pick-up position at the supply station,
    a unit adapted to receive and test the polarity of the successive articles,
    an orienting unit,
    an element therefor having an aperture with normal upper and lower ends adapted to receive the articles successively,
    a unit actuable to transfer articles from the pick-up position at the supply station to the test unit and from the test unit to the aperture of the element, and
    a feeder adapted to remove the articles from the element singly and feed them to successive receptacles.

2. An apparatus for feeding polarized articles according to claim 1 in which:
    means for operating the orienting unit remains unoperated for all articles in the predetermined position and is responsive to each article not in the predetermined position to operate the unit to orient said articles to the predetermined position.

3. An apparatus for feeding polarized articles according to claim 1 in which:
    the orienting unit has a movable support,
    a drive means, and
    means operable thereby to move the support between a loading position, where the successive articles are placed in the aperture of the element by the transfer unit, and an unloading position in alignment with the feeder.

4. An apparatus for feeding polarized articles according to claim 1 in which:
    the orienting unit has a movable support,
    a drive means,
    means operable thereby to move the support between a loading position, where the successive articles are placed in the aperture of the element by the transfer unit, and an unloading position in alignment with the feeder,
    a first closure member movably mounted in the orienting unit and normally closing the normal lower end of the aperture,
    a second closure member movably carried by the orienting unit and adapted to close the normal upper end of the aperture, and
    means normally positioning the second closure member free of the upper end of the aperture.

5. An apparatus for feeding polarized articles according to claim 1 in which:
    the orienting unit has a movable support,
    a drive means,
    means operable thereby to move the support between a loading position, where the successive articles are placed in the aperture of the element by the transfer unit, and an unloading position in alignment with the feeder,
    a first closure member movably mounted in the orienting unit and normally closing the normal lower end of the aperture,
    a second closure member movably carried by the orienting unit and adapted to close the normal upper end of the aperture,
    means normally positioning the second closure member free of the upper end of the aperture, and
    means mounted in the orienting unit to cause movement of the second closure member over the normal upper end of the aperture when the orienting unit is rotated to invert the article.

6. An apparatus for feeding polarized articles according to claim 1 in which:
    the orienting unit has a movable support,
    a drive means,
    means operable thereby to move the support between a loading position, where the successive articles are placed in the aperture of the element by the transfer unit, and an unloading position in alignment with the feeder,
    a first closure member movably mounted in the orienting unit and normally closing the normal lower end of the aperture,
    a second closure member movably carried by the orienting unit and adapted to close the normal upper end of the aperture,
    means normally positioning the second closure member free of the upper end of the aperture, and
    a projection fixed to the first closure member adapted to engage the feeder while moving with the orienting unit toward the unloading position to position the first closure member free of the normal lower end when the orienting unit has been actuated to invert the article.

7. An apparatus for feeding polarized articles according to claim 1 in which:
the orienting unit has a movable support,
a drive means,
means operable thereby to move the support between a loading position, where the successive articles are placed in the aperture of the element by the transfer unit, and an unloading position in alignment with the feeder, and
means for operating the orienting unit remains ineffective for each article in the predetermined position and effective in responsive to the test unit for each article not in the predetermined position to operate the orienting unit to invert each of said articles.

8. An apparatus for feeding polarized articles according to claim 1 in which:
the orienting unit has a movable support,
a drive means,
means operable thereby to move the support between a loading position, where the successive articles are placed in the aperture of the element by the transfer unit, and an unloading position in alignment with the feeder,
means for operating the orienting unit remains ineffective for each article in the predetermined position and effective in responsive to the test unit for each article not in the predetermined position to operate the orienting unit to invert each of said articles,
the operating means for the orienting unit including a fluid operable cylinder having a piston rod operatively connected to the orienting unit, and
an energizable valve responsive to the test unit and adapted to cause the cylinder to return the orienting unit to the normal position, said valve being energized in response to the test unit testing an article not in the predetermined position to invert said article.

References Cited in the file of this patent
UNITED STATES PATENTS

| | | |
|---|---|---|
| 2,829,761 | Roeber | Apr. 8, 1958 |
| 2,881,899 | Rasmussen | Apr. 14, 1959 |
| 2,967,642 | Curry | Jan. 10, 1961 |
| 3,039,623 | Sehn | June 19, 1962 |